United States Patent [19]
Kalajan et al.

[11] Patent Number: 5,935,212
[45] Date of Patent: Aug. 10, 1999

[54] CONNECTION-ORIENTED SESSION EMULATION

[75] Inventors: Kevin E. Kalajan, Redwood City, Calif.; Thomas R. Mueller, Fremont, Nebr.

[73] Assignee: I-Planet, Inc., Sunnyvale, Calif.

[21] Appl. No.: 08/908,626

[22] Filed: Aug. 7, 1997

[51] Int. Cl.⁶ .................................................. G06F 15/16
[52] U.S. Cl. ............................ 709/228; 380/49; 709/203
[58] Field of Search ......................... 395/200.57, 200.56, 395/200.32, 200.33, 200.58; 709/228, 203; 380/49

[56] References Cited

U.S. PATENT DOCUMENTS

| | | | |
|---|---|---|---|
| 5,657,390 | 8/1997 | Elgamal et al. | 380/49 |
| 5,754,774 | 5/1998 | Bittinger et al. | 395/200.33 |
| 5,768,525 | 6/1998 | Kralowetz et al. | 395/200.58 |

OTHER PUBLICATIONS

Information Sciences Institute, "Transmission Control Protocol—DARPA Internet Program Protocol Specification", Sep. 1981; http:www.csl.sony.co.jp/cgi–bin/hyperrfc?rfc793.txt.

Berners–Lee et al., "Hypertext Transfer Protocal—HTTP/1.0"; May 1996; htt://www.cis.ohio–state.edu/htbin/rfc/rfc1945.html.

*Primary Examiner*—Ellis B. Ramirez
*Assistant Examiner*—William Titcomb
*Attorney, Agent, or Firm*—Fish & Richardson P.C.

[57] ABSTRACT

A method for emulating a connection-oriented session across a network between a client and a server, using a stateless communication protocol, includes the steps of maintaining a persistent proxy coupling with the server, and transiently establishing a transient proxy coupling between a communication medium server and the persistent proxy coupling, the communication medium server being coupled to the network for passing communications packets back and forth with the client.

54 Claims, 6 Drawing Sheets

CONNECTION-ORIENTED SESSION EMULATION

CONNECTION-ORIENTED SESSION EMULATION BACKGROUND

The present invention relates generally to electronic communications.

Figure 1:
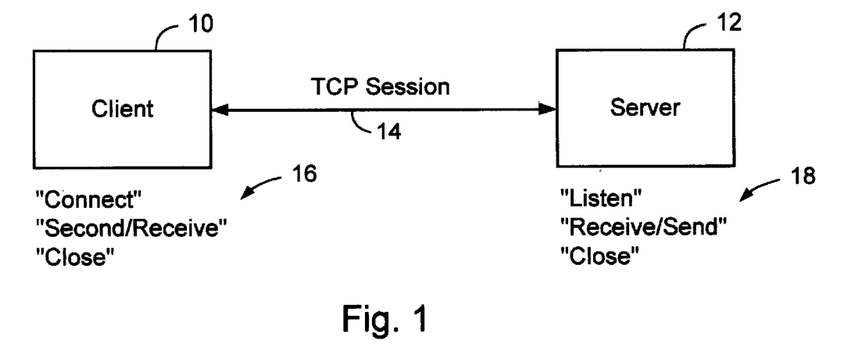
FIG. 1 is a schematic of a TCP session between a client and a server.

Computer networks (e.g., LANs) implement communications between requesters of information (clients) and providers of information (servers) via various protocol communication schemes. Referring to FIG. 1, a popular protocol, Transmission Control Protocol (TCP), forms a TCP communication session 14 between a client 10 and a server 12. A "session" here means any stateful (or state-based) connection or stateful communications stream, using, e.g., TCP as a networking transport. Client 10 and server 12 issue respective sets of primitives 16 and 18 that are translated into TCP messages which govern their communication. Server 12 "listens" to one or more of its communications ports until a client 10 transmits a "connect" instruction. Then server 12 and client 10 post "send" and "receive" messages for transmitting data packets, after which session 14 is "closed" by both client 10 and server 12. Each client and server participating in a TCP session must have a valid network address such that the network correctly routes information between client and server.

Figure 2:
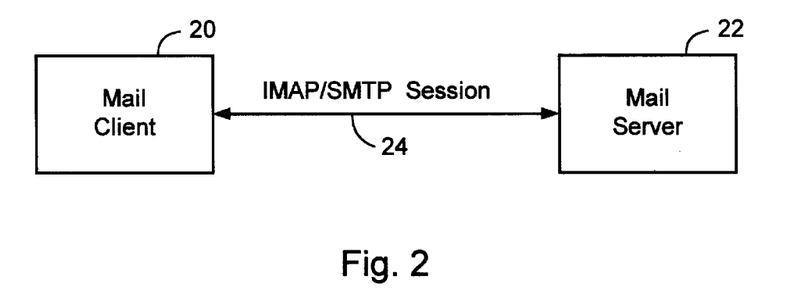
FIG. 2 is a schematic of an IMAP TCP session between an e-mail client and server.

Electronic mail (e-mail) service can be accomplished by such client/server TCP communications over a network. Two protocols typically govern TCP e-mail communications: IMAP (or Interactive Mail Access Protocol) governs requests for e-mail messages from an e-mail server, and SMTP (or Simple Mail Transport Protocol) governs the packaging and sending of e-mail messages to the e-mail server. As shown in FIG. 2, IMAP and SMTP TCP sessions 24 can be formed between an e-mail client 20 (e.g., a computer user with a network e-mail account) and an e-mail server 22 (e.g., the network server that receives, stores, and retrieves e-mail messages).

Should developers and service providers wish to allow e-mail clients to send and receive e-mail messages across public networks such as the Internet in a secure fashion, or easily through a "firewall", (or conduct other, similar, TCP sessions for other types of applications), such developers and providers face several difficulties. First, many TCP standard protocols (e.g., IMAP and SMTP) do not provide encryption. Since many TCP applications (e.g., e-mail) are required by users to provide secure communications, separate encryption schemes would need to be written and then made available at both client and server. Second, while local LANs can provide strictly valid network addresses for conducting a communication session between client (such as an individual LAN PC) and a server (such as an e-mail service provider), local LAN network addresses are typically stripped, or translated to other, proxy addresses by Internet routers. To create a TCP session over the Internet, a custom proxy addressing application would have to been written and loaded into the client router.

SUMMARY

In general, in one aspect, the invention features a method for emulating a connection-oriented session across a network between a client and a server, using a stateless communication protocol, including the steps of maintaining a persistent proxy coupling with the server, and transiently establishing a transient proxy coupling between a communication medium server and the persistent proxy coupling, the communication medium server being coupled to the network for passing communications packets back and forth with the client.

Embodiments of the invention may include the following features. The connection-oriented session can be a TCP session. The stateless communication protocol can be HTTP. The network can be a TCP/IP-compatible network. The communication medium server can be an HTTP server. A connection-oriented session request issued by the client can be translated into a stateless communication protocol-compliant message. The stateless communication protocol-compliant message can be translated back into the connection-oriented session request and provided to the server, and the transient proxy coupling can translate the stateless communication protocol-compliant message back into the connection-oriented session request. The persistent proxy coupling can remain active during the connection-oriented session. The transient proxy coupling can close substantially coincident with the transmission of data from the server to the client. The persistent proxy coupling can signal the transient proxy coupling to close, and can do so if it has not received data from the server for a selected length of time. The transient proxy coupling can be initiated by the communication medium server upon receiving a message from the client. The persistent proxy coupling, if not already active, can be initiated by the transient proxy coupling. The transient proxy coupling and the persistent proxy coupling can be closed at the end of the connection-oriented session. The client and the communication medium server can use encryption techniques for exchanging communication packets. The communication medium server can be an HTTP server and the encryption techniques can be SSL. The client and the communication medium server can use compression techniques for exchanging communication packets.

In general, in another aspect, the invention features an apparatus for emulating a connection-oriented session across a network between a client and a server, using a stateless communication protocol, the connection-oriented session being mediated through a communication medium server, the communication medium server being coupled to the network for passing communications packets back and forth with the client, the apparatus including a persistent proxy coupled to the server, and a transient proxy coupled between the communication medium server and the persistent proxy.

In general, in another aspect, the invention features an apparatus for emulating a TCP session between a TCP client and a TCP server over a TCP/IP-compatible network connection through an HTTP server, including a transient proxy TCP socket application coupled to the HTTP server, the transient proxy TCP socket application closing substantially coincident with the transmission of data from the TCP server to the TCP client, and a persistent proxy TCP socket application coupled to the transient proxy TCP socket application, the persistent proxy TCP socket application coupled to the TCP server, the persistent proxy TCP socket application remaining active during the emulated TCP session with the TCP server.

In general, in another aspect, the invention features a storage device tangibly storing a control program, the control program, when coupled to a control device, operating the control device to emulate a connection-oriented session between a client and a server, the connection-oriented session complying with a stateless communication over a network, the connection-oriented session being mediated through a communication medium server for passing communication packets back and forth with the client, the control program being configured to operate the control device to perform the function of maintaining a persistent proxy coupling with the server, and transiently establishing a transient proxy coupling between the communication medium server and the persistent proxy coupling.

Advantages of the invention include one or more of the following. TCP sessions can be emulated through widely available HTTP services. Using HTTP with the Secure Socket Layer (SSL), developed by Netscape Communications Corp., client and server software can emulate sessions to immediately and transparently provide secure data transmissions, without any user involvement or additional, and possibly cumbersome, specially-developed encryption layers. Furthermore, in an e-mail context, a user can be provided an applet that supports an emulated session for reading e-mail from an HTTP web site, reducing the software components needed in advance by a client to use the system. The session emulation procedures can be adapted to emulate any TCP session communication through a TCP/IP-compatible communication network.

These and other features and advantages of the present invention will become more apparent from the following description, drawings, and claims.

DESCRIPTION

Figure 3:
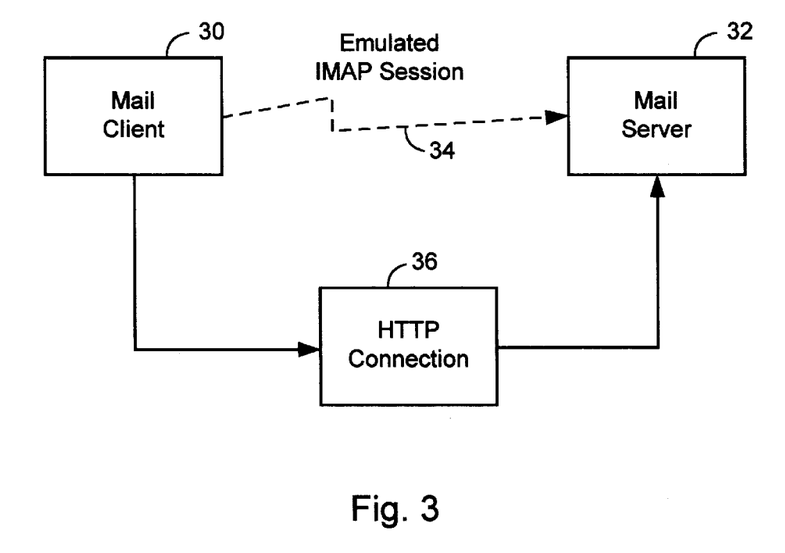
FIG. 3 is a schematic of an emulated TCP session between a client and a server.

Referring to FIG. 3, emulated session 34 (here, an IMAP connection) between mail client 30 and TCP mail server 32 is handled via an HTTP or HTTPS connection 36. HTTPS is the protocol associated with TCP/IP port 443, and which currently uses SSL schemes for encryption of data. When referring to HTTP connections, HTTPS or any other variant of HTTP is understood to be included, unless otherwise indicated by the context.

Figure 4:
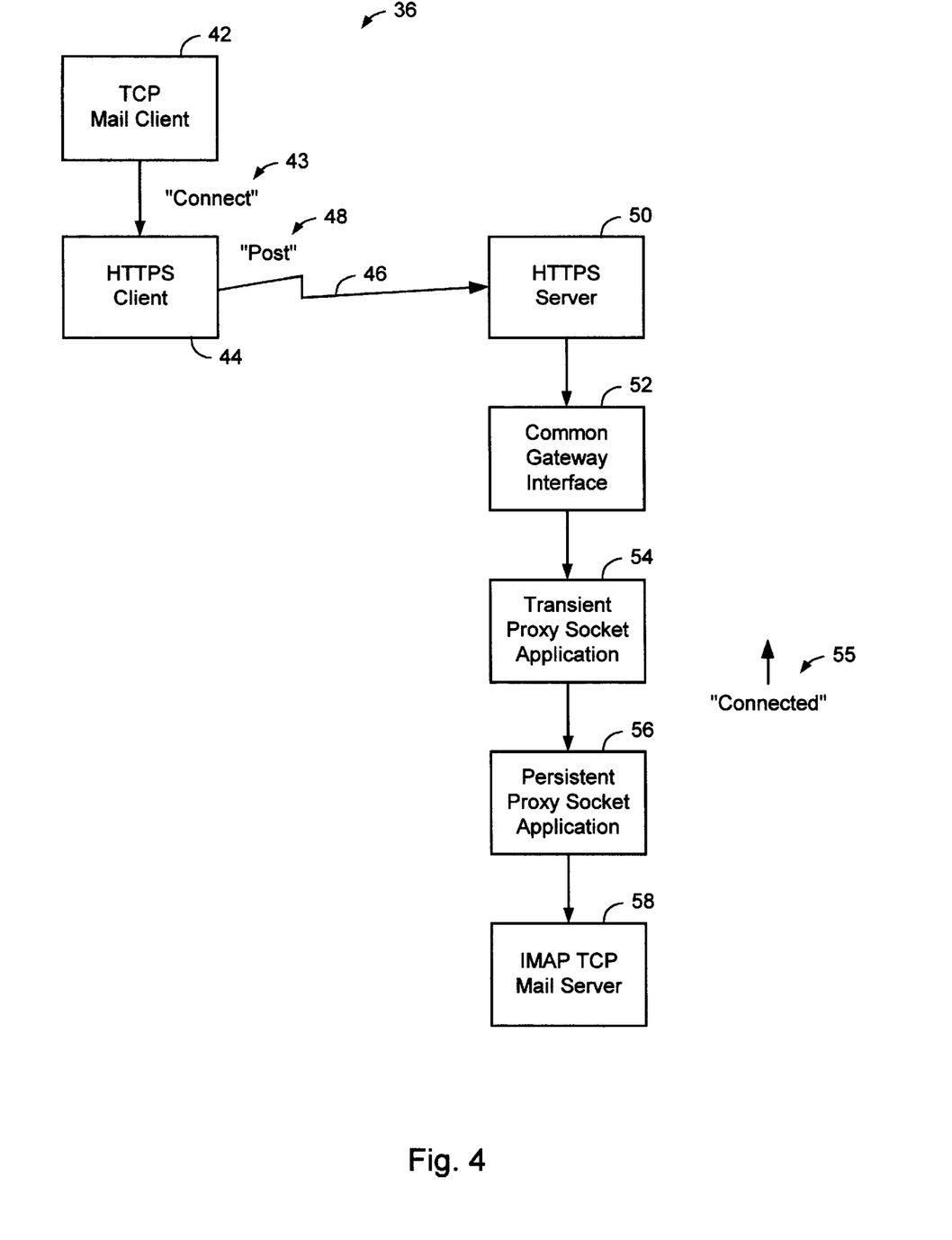
FIG. 4 is a block diagram of an emulated TCP session.

Referring to FIG. 4, HTTP connection 36, which provides emulated session 34, starts with client 42. Client 42 can be a personal computer, a LAN server, an Internet service provider router, among other entities. Client 42 sends a TCP connection request (43) to HTTPS server 44, asking to establish a connection over Internet 46. "Internet" is understood to comprise any TCP/IP-compatible network connection, including TCP/IP "intra-nets". A client library intercepts and converts client TCP session primitives (such as "connect", "read" data, "write" data, and "close") into one or more HTTP-compatible messages. HTTP client 44 then "posts" (48) the HTTP-compatible message(s) onto Internet 46, destined for HTTP server 50. The client library can be implemented as a set of subroutine calls that seem like normal TCP session primitives to the client application, but which map to the new HTTP-compatible messages. One option for implementing the client library is to add or adapt a dynamic linked library having the mapping between TCP session primitives and HTTP-compatible messages. Another option is to route all TCP session primitives from a given application to a designated server that translates those TCP session primitives into HTTP-compatible messages.

Typically, web server 50 has a common gateway interface (CGI) layer 52 that is continually invoked as needed to process all incoming and outgoing messages and hand them to appropriate processes/machines. Here, the received HTTP-compatible message is handed to transient proxy socket application 54, which, after translation, in turn hands the TCP session primitive to persistent proxy socket application 56. Persistent Proxy Socket application 56, in turn, hands primitives (or other messages) to and from TCP (IMAP/SMTP) mail server 58.

The two transient and persistent proxy socket applications 54 and 56 cooperate to enable CGI 52 to emulate a persistent TCP session using HTTP services. Persistent Proxy Socket application 56 remains active during the entire emulated TCP session, handling TCP message flow to and from TCP mail server 58. Transient proxy socket application 54 runs and terminates upon each outgoing message packet sent by persistent proxy socket application 56, since under HTTP, CGI 52 does not send a packet until the program providing the packet terminates, or until some arbitrarily large amount of data (the size of which varies depending upon the server) has been buffered. Transient proxy socket application 54 provides the required terminating program for CGI 52.

CGI 52 is typically invoked each time an incoming web request is handled. However, a CGI-like application can be embedded or linked into the primary HTTP server operating system, so that only subroutines are called to handle each web request, instead of invoking an entire instance of CGI.

Once an emulated TCP session 34 has been established in this manner, TCP session messages can be sent to and from server 58 and client 42. Once the emulated TCP session has completed, both client 42 and server 58 can close the session, and both transient and persistent proxy socket applications 54 and 56 terminate.

Figure 5A:
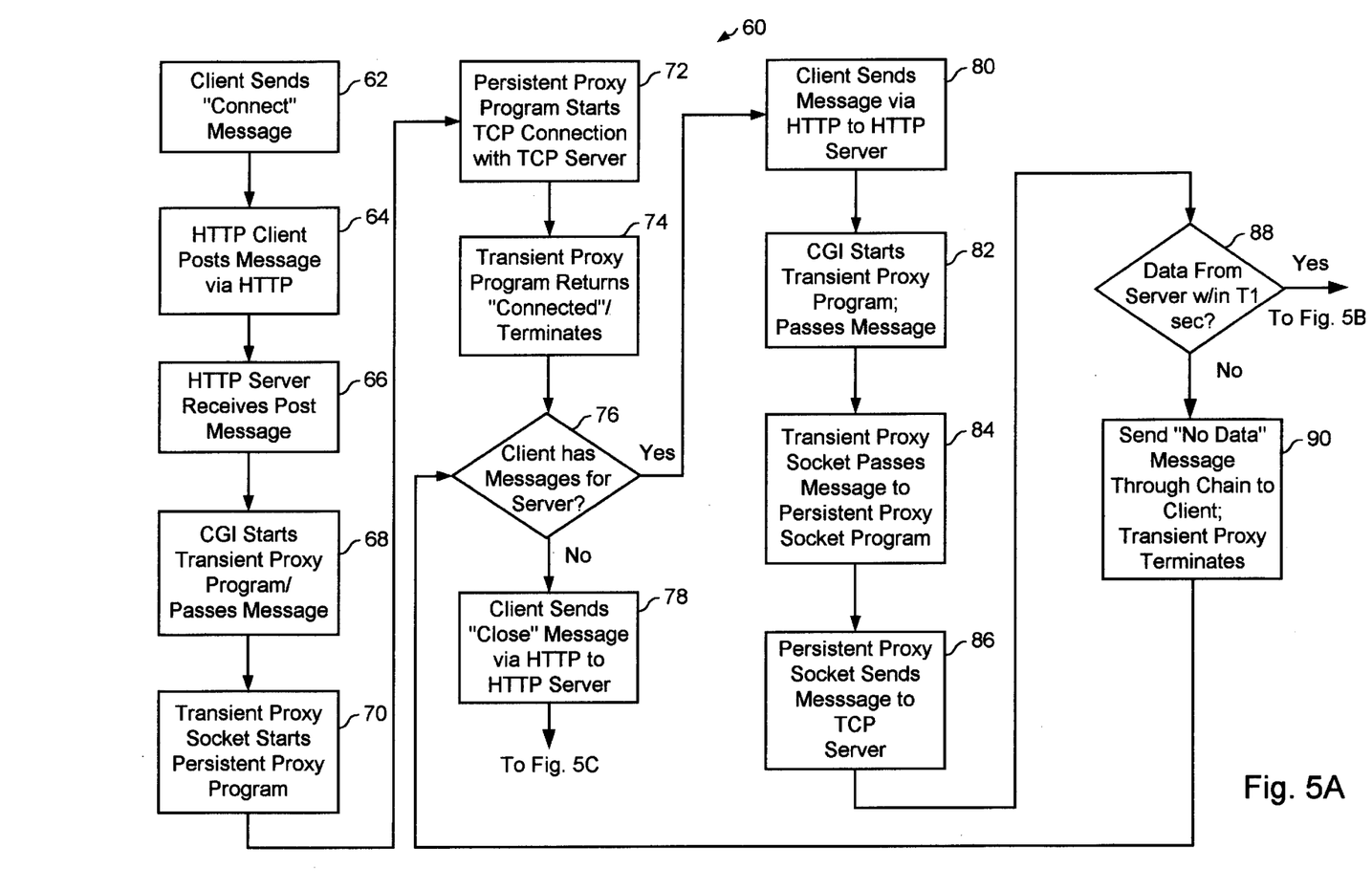
FIGS. 5a through 5c are flow charts of an emulated TCP session emulation.
Figure 5B:
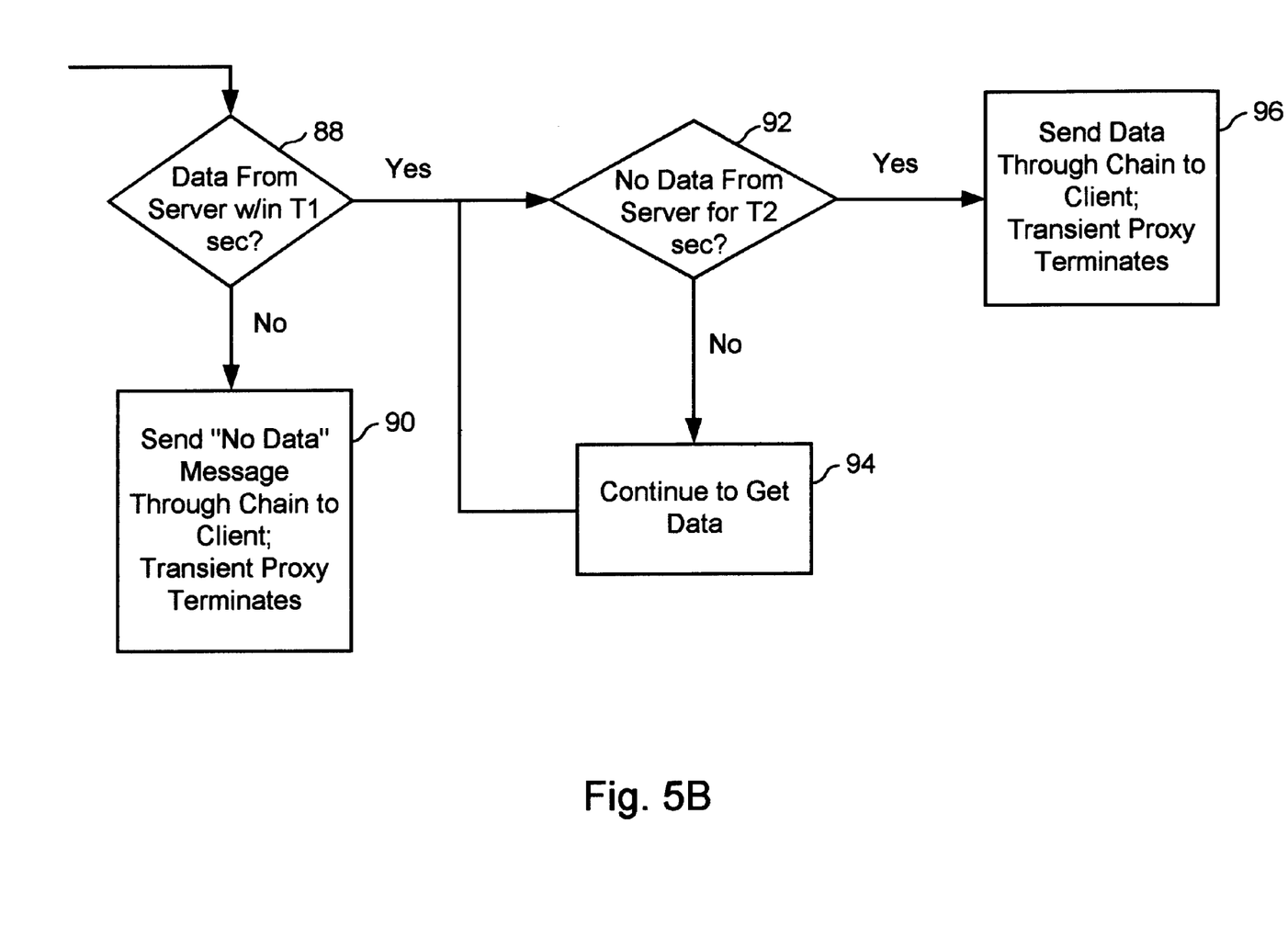
Figure 5C:
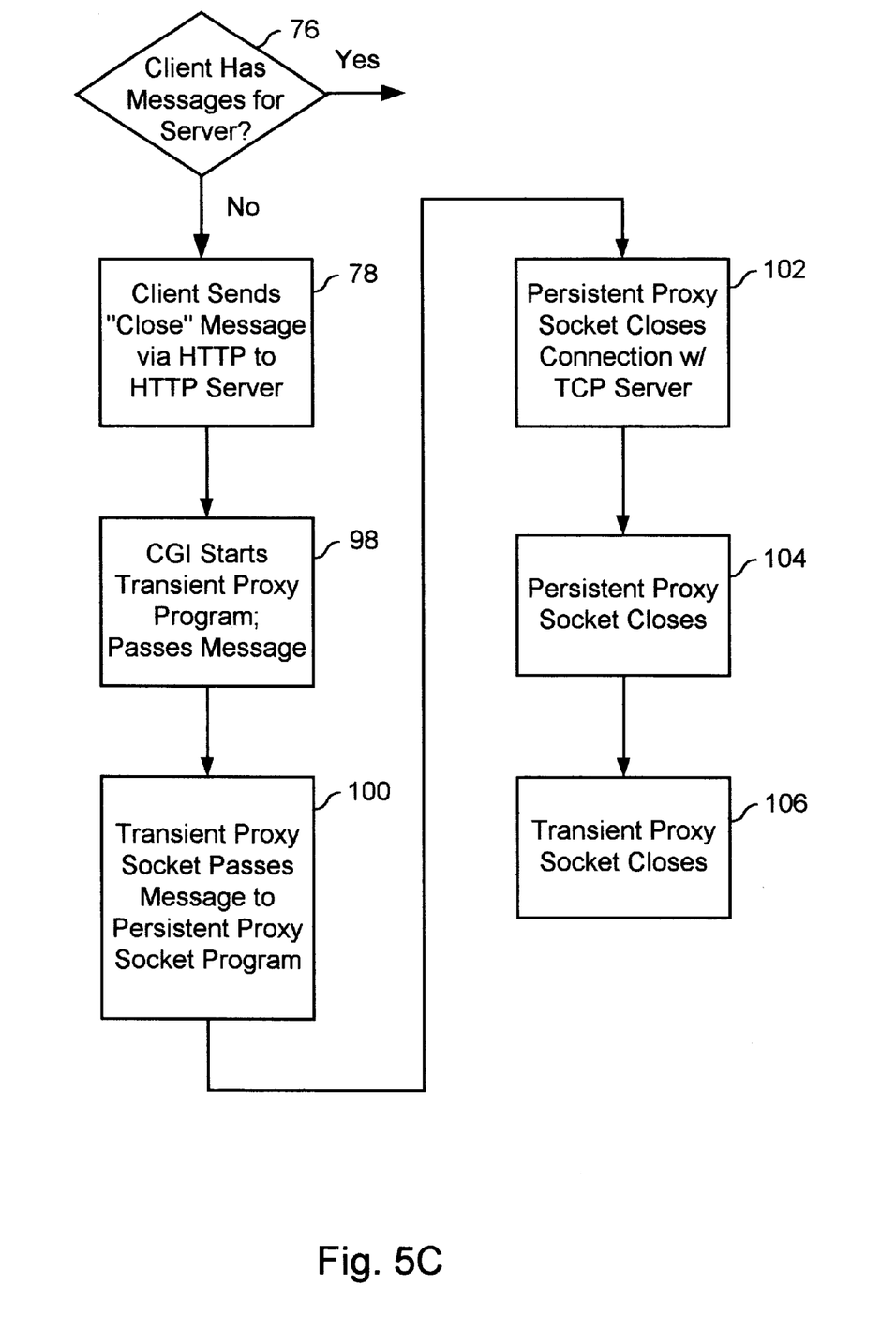

Referring to FIGS. 5a through 5c, an emulated TCP e-mail session 60 begins when TCP client 42 sends a TCP "connect" primitive (step 62) to HTTPS client 44. The TCP primitive is first translated (or encapsulated) into an HTTP-compatible message, which HTTPS client 44 then posts via the HTTP protocol onto Internet 46 (step 64). Appropriate formation and posting of messages by client 42 can be handled by a local application, or by an applet downloaded from, for example, a web site being contacted for the emulated TCP session. Such applications can be written in Java®, which has the added advantage of automatically providing instruction primitives for encoding and decoding HTTPS encrypted messages (using SSL).

When appropriate HTTP server 50 receives the posted HTTP-compatible message (step 66), it invokes CGI 52 which in turn starts transient proxy socket application 54 to which it passes the HTTP-compatible message (step 68). Transient proxy socket application 54 decodes the received HTTP-compatible message into the TCP primitive sent by client 42, starts persistent proxy socket application 56 while opening a separate local TCP channel between the two applications 54 and 56, and then passes the client's TCP primitive to persistent proxy socket application 56 (step 70). Persistent proxy socket application 56, in turn, connects to TCP server 58 (step 72), completing the emulated TCP session. After this, transient proxy socket application 54 returns a "connected" message back through HTTP server 50 to client 42 via HTTP (step 74) while terminating.

During an emulated TCP session, so long as client 42 has messages (primitives and other instructions or data) for TCP server 58, client 42 can send them, translated into an HTTP-compatible message, via the HTTP link to HTTP server 50 (step 80). Each received message invokes CGI 52 to restart transient proxy socket application 54 to which it passes the message (step 82). Transient proxy socket application 54 then decodes the TCP message and opens a local TCP channel to persistent proxy socket application 56, to which it sends the latest decoded TCP message (step 84). Persistent proxy socket application 56 then passes the message to TCP server 58 (step 86). As one important note, client 42 can send 0 byte data commands to TCP server 58 at any time, just to see if there is any data to read from TCP server 58.

The local TCP channel opened by transient proxy application 54 (upon initiation) is independent from the emulated TCP session between client 42 and server 58. The local TCP channel allows the transient and persistent proxy application 54 and 56 to reside on the same or different machines on a network (for example, the transient application can reside on a web server, while the persistent application can reside on the TCP server). Persistent proxy application 56 signals transient proxy application 54 to close, by closing the local TCP channel. However, the transient and persistent proxy socket applications 54 and 56 do not necessarily require their own TCP channel. For example, the two applications 54 and 56 can reside on the same machine, and communicate in some other fashion.

Typically, TCP server 58 will have data or other messages to send back to client 42. Various timing schemes can be used to close transient proxy socket application 54 at appropriate times during the emulated TCP data transmission. For example, persistent proxy socket application 56 can wait for data for T1 seconds (e.g., 2 seconds) (step 88). If no data is received within that period, a "no data" message is sent back to client 42 through the chain (transient proxy socket application 54 terminates, after persistent proxy socket application 56 closes the local TCP channel, to allow sending the message) (step 90). Referring to FIG. 5b, so long as some data is received by the end of period T1, the data stream is accumulated from TCP server 58 (steps 92 and 94) until no data is received for some other period T2 (e.g., 0.2 seconds), after which persistent proxy socket application 56 closes the local TCP channel, causing transient proxy socket application 54 to close and CGI 52 to return the pending data packet (step 96). These times can be adjusted as needed depending upon the data types and sizes being requested, and can be dynamically set by an instruction sent by client 42 upon setting up (or during) the emulated TCP session.

Referring to FIG. 5c, when client 42 has no more requests for TCP server 58 (i.e., the TCP session should be closed), client 42 sends a translated "close" primitive via HTTP to HTTP server 50 (step 78), which again invokes CGI 52 which in turn starts transient proxy socket application 54, to which it passes the "close" message (steps 78 and 98). Transient proxy socket application 54 translates and then passes the "close" message to the still-pending persistent proxy socket application 56 (step 100), which then closes the TCP connection with TCP server 58 (step 102), and closes itself and the local TCP channel (step 104), after which transient proxy socket application 54 closes (step 106) and the emulated TCP connection session 34 ends.

Figure 6:
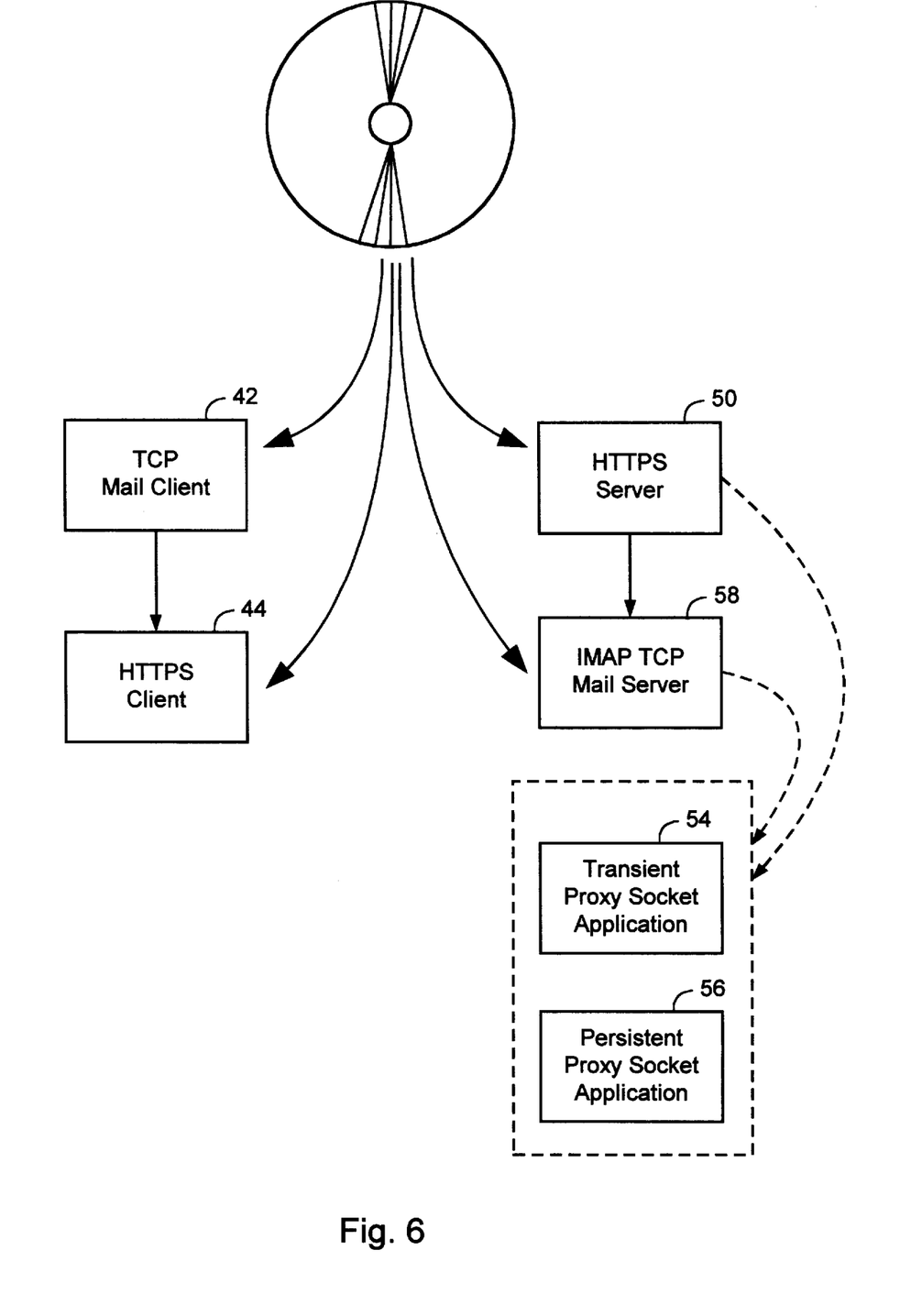
FIG. 6 is a block diagram of a machine-readable device encoded with software for generating an emulated TCP session.

Referring to FIG. 6, software 130 for providing session emulation services can be placed upon any machine-readable device, such as a floppy disk, CD-ROM, removable hard drive, or other memory device, and can then be loaded into a client 42 and/or a server 58. Software 130 can include code which, when loaded into a client 42 (or into a client's HTTP server 44), provides the software library for mapping conventional TCP session primitives into emulated session messages for sending over network 46. Software 130 can also include code which, when loaded into a server 58 (and/or a server's HTTP server 50), provides the application software needed to generate appropriate transient and persistent proxy socket applications 54 and 56.

Emulating a TCP session, in the above-described manner, through the HTTPS protocol (instead of HTTP) provides automatic data encryption, without any additional programming. For example, a client can request e-mails from a web page on the Internet and all transmitted e-mails will be fully encrypted and secured against retrieval and decoding by others. By employing HTTPS to emulate a TCP session, communication links are encrypted "for free". Further, any other functional additions to the SSL or HTTP protocols (e.g., compression of data) are also automatically gained by applications using such emulated sessions. Though implemented using HTTP, emulated sessions can be implemented with any protocol that supports program-to-program communications over the Internet or World Wide Web, or other networks.

Furthermore, any World-Wide-Web-based server application that employs a TCP emulation system can send emulation applets to users who log on to their web page, providing ad hoc TCP session emulation on an as-needed basis.

Other embodiments are within the scope of the claims. For example, other stateful sessions can be emulated, using, for example, Sequence Packet Exchange (SPX) from Novell, System Network Architecture (SNA) from IBM, Xerox Network System (XNS) from Xerox, OSI/X25 Connection Oriented Networking Service (CONS), or Banyan Vines, DECNET, or AppleTalk connection-oriented services.

Various TCP client and server relationships can be emulated across non-TCP connections. Thereby, any transaction-oriented TCP service that does not support encryption and/or a firewall proxy application can be enhanced with these features using an emulated TCP session. By "transaction-oriented" is meant an application where a server responds to client requests. Other arrangements for transient and persistent proxy socket applications can be made. For example, the proxy socket applications could be used without an underlying (e.g., Java) library of routines, such that another CGI program on the server could call the proxy socket applications directly to implement an HTML-based e-mail client without using the routine library. Either HTTP or HTTPS can be used to emulate a TCP session, depending upon whether the automatic encryption of HTTPS is desired or available.

What is claimed is:

1. A method for emulating a connection-oriented session across a network between a client and a server, using a stateless communication protocol, comprising:

maintaining a persistent proxy coupling with the server, and transiently establishing a transient proxy coupling between a communication medium server and the persistent proxy coupling, the communication medium server being coupled to the network for passing communications packets back and forth with the client.

2. The method of claim 1 wherein the connection-oriented session is a TCP session.

3. The method of claim 1 wherein the stateless communication protocol comprises HTTP.

4. The method of claim 1 wherein the network comprises a TCP/IP-compatible network.

5. The method of claim 1 wherein the communication medium server comprises an HTTP server.

6. The method of claim 1 wherein a connection-oriented session request issued by the client is translated into a stateless communication protocol-compliant message.

7. The method of claim 6 wherein the stateless communication protocol-compliant message is translated back into the connection-oriented session request and provided to the server.

8. The method of claim 7 wherein the transient proxy coupling translates the stateless communication protocol-compliant message back into the connection-oriented session request.

9. The method of claim 1 wherein the persistent proxy coupling remains active during the connection-oriented session.

10. The method of claim 1 wherein the transient proxy coupling closes substantially coincident with the transmission of data from the server to the client.

11. The method of claim 10 wherein the persistent proxy coupling signals the transient proxy coupling to close.

12. The method of claim 11 wherein the persistent proxy coupling signals the transient proxy coupling to close if the persistent proxy coupling has not received data from the server for a selected length of time.

13. The method of claim 1 wherein the transient proxy coupling is initiated by the communication medium server upon receiving a message from the client.

14. The method of claim 13 wherein the persistent proxy coupling, if not already active, is initiated by the transient proxy coupling.

15. The method of claim 1 wherein the transient proxy coupling and the persistent proxy coupling are closed at the end of the connection-oriented session.

16. The method of claim 1 wherein the client and the communication medium server use encryption techniques for exchanging communication packets.

17. The method of claim 1 wherein the communication medium server comprises an HTTP server and the encryption techniques comprise SSL.

18. The method of claim 1 wherein the client and the communication medium server use compression techniques for exchanging communication packets.

19. Apparatus for emulating a connection-oriented session across a network between a client and a server, using a stateless communication protocol, the connection-oriented session being mediated through a communication medium server, the communication medium server being coupled to the network for passing communications packets back and forth with the client, comprising:

a persistent proxy coupled to the server, and a transient proxy coupled between the communication medium server and the persistent proxy.

20. The apparatus of claim 19 wherein the connection-oriented session is a TCP session.

21. The apparatus of claim 19 wherein the stateless communication protocol comprises HTTP.

22. The apparatus of claim 19 wherein the network comprises a TCP/IP-compatible network.

23. The apparatus of claim 19 wherein the communication medium server comprises an HTTP server.

24. The apparatus of claim 19 wherein the persistent proxy remains active during the connection-oriented session.

25. The apparatus of claim 19 wherein the transient proxy closes substantially coincident with the transmission of data from the server to the client.

26. The apparatus of claim 25 wherein the persistent proxy signals the transient proxy to close.

27. The apparatus of claim 26 wherein the persistent proxy signals the transient proxy to close if the persistent proxy has not received data from the server for a selected length of time.

28. The apparatus of claim 19 wherein the transient proxy is initiated by the communication medium server upon receiving a message from the client.

29. The apparatus of claim 28 wherein the persistent proxy, if not already active, is initiated by the transient proxy.

30. The apparatus of claim 19 wherein the transient proxy and the persistent proxy are closed at the end of the connection-oriented session.

31. The apparatus of claim 19 wherein the client and the communication medium server use encryption techniques for exchanging communication packets.

32. The apparatus of claim 19 wherein the communication medium server comprises an HTTP server and the encryption techniques comprise SSL.

33. The apparatus of claim 19 wherein the client and the communication medium server use compression techniques for exchanging communication packets.

34. Apparatus for emulating a TCP session between a TCP client and a TCP server over a TCP/IP-compatible network connection through an HTTP server, comprising:

a transient proxy TCP socket application coupled to the HTTP server, the transient proxy TCP socket application closing substantially coincident with the transmission of data from the TCP server to the TCP client; and a persistent proxy TCP socket application coupled to the transient proxy TCP socket application, the persistent proxy TCP socket application coupled to the TCP server, the persistent proxy TCP socket application remaining active during the emulated TCP session with the TCP server.

35. The apparatus of claim 34 wherein the TCP client and HTTP server use encryption techniques for exchanging messages.

36. The apparatus of claim 34 wherein the encryption techniques comprise SSL.

37. A storage device tangibly storing a control program, the control program, when coupled to a control device, operating the control device to emulate a connection-oriented session between a client and a server, using a stateless communication protocol over a network, the connection-oriented session being mediated through a communication medium server for passing communication packets back and forth with the client, the control program being configured to operate the control device to perform the function of:

maintaining a persistent proxy coupling with the server; and transiently establishing a transient proxy coupling between the communication medium server and the persistent proxy coupling.

38. The storage device of claim 37 wherein the connection-oriented session is a TCP session.

39. The storage device of claim 37 wherein the stateless communication protocol comprises HTTP.

40. The storage device of claim 37 wherein the network comprises a TCP/IP-compatible network.

41. The storage device of claim 37 wherein the communication medium server comprises an HTTP server.

42. The storage device of claim 37 wherein a connection-oriented session request issued by the client is translated into a stateless communication protocol-compliant message.

43. The storage device of claim 42 wherein the stateless communication protocol-compliant message is translated back into the connection-oriented session request and provided to the server.

44. The storage device of claim 43 wherein the transient proxy coupling translates the stateless communication protocol-compliant message back into the connection-oriented session request.

45. The storage device of claim 37 wherein the persistent proxy coupling remains active during the connection-oriented session with the server.

46. The storage device of claim 37 wherein the transient proxy coupling closes substantially coincident with the transmission of data from the server to the client.

47. The storage device of claim 46 wherein the persistent proxy coupling signals the transient proxy coupling to close.

48. The storage device of claim 47 wherein the persistent proxy coupling signals the transient proxy coupling to close if the persistent proxy coupling has not received data from the server for a selected length of time.

49. The storage device of claim 37 wherein the transient proxy coupling is initiated by the communication medium server upon receiving a message from the client.

50. The storage device of claim 49 wherein the persistent proxy coupling, if not already active, is initiated by the transient proxy coupling.

51. The storage device of claim 37 wherein the transient proxy coupling and the persistent proxy coupling are closed at the end of the connection-oriented session.

52. The storage device of claim 37 wherein the client and communication medium server use encryption techniques for exchanging communication packets.

53. The storage device of claim 37 wherein the communication medium server comprises an HTTP server and the encryption techniques comprise SSL.

54. The storage device of claim 37 wherein the client and communication medium server use compression techniques for exchanging communication packets.

* * * * *